United States Patent
Brown

[19]

[11] Patent Number: 5,890,353
[45] Date of Patent: Apr. 6, 1999

[54] ADJUSTABLE CHOPPER SHAFT

[75] Inventor: Wayne Brown, Mackay, Australia

[73] Assignee: Westhill Engineering Construction, Australia

[21] Appl. No.: 7,275

[22] Filed: Jan. 14, 1998

[30] Foreign Application Priority Data

Jan. 15, 1997 [AU] Australia .................................. PO4619

[51] Int. Cl.⁶ .................................................. A01D 45/02
[52] U.S. Cl. .......................... 56/60; 56/51; 56/52; 56/53; 56/504; 460/112; 460/113; 241/293; 241/236; 241/37
[58] Field of Search .................................. 56/51, 52, 53, 56/60, 504, 503, DIG. 1, DIG. 6; 460/112, 113; 241/293, 236, 37

[56] References Cited

U.S. PATENT DOCUMENTS

| | | | |
|---|---|---|---|
| 3,599,404 | 8/1971 | Fernandez | 56/14.3 |
| 3,848,399 | 11/1974 | Makeham | 56/13.9 |
| 4,019,308 | 4/1977 | Quick | 56/13.9 |
| 4,065,912 | 1/1978 | Ouick | 56/13.9 |
| 4,555,896 | 12/1985 | Stiff et al. | 56/13.9 |
| 4,677,813 | 7/1987 | Stiff et al. | 56/13.9 |
| 5,031,392 | 7/1991 | Baker | 56/13.9 |
| 5,622,034 | 4/1997 | Dommert | 56/11.7 |

*Primary Examiner*—Thomas B. Will
*Assistant Examiner*—Arpad Fabian Kovas
*Attorney, Agent, or Firm*—St. Onge Steward Johnston & Reens LLC

[57] ABSTRACT

An adjustable chopper shaft is disclosed including a chopper shaft (14), a gear (18) concentrically mounted on the chopper shaft, the gear being accomodated in a gearbox (40). A setup (30, 32) for selectively allowing rotation of the chopper shaft relative to the gear are provided and this setup for selectively allowing rotation of the chopper shaft relative to the gear is located externally of the gearbox.

5 Claims, 2 Drawing Sheets

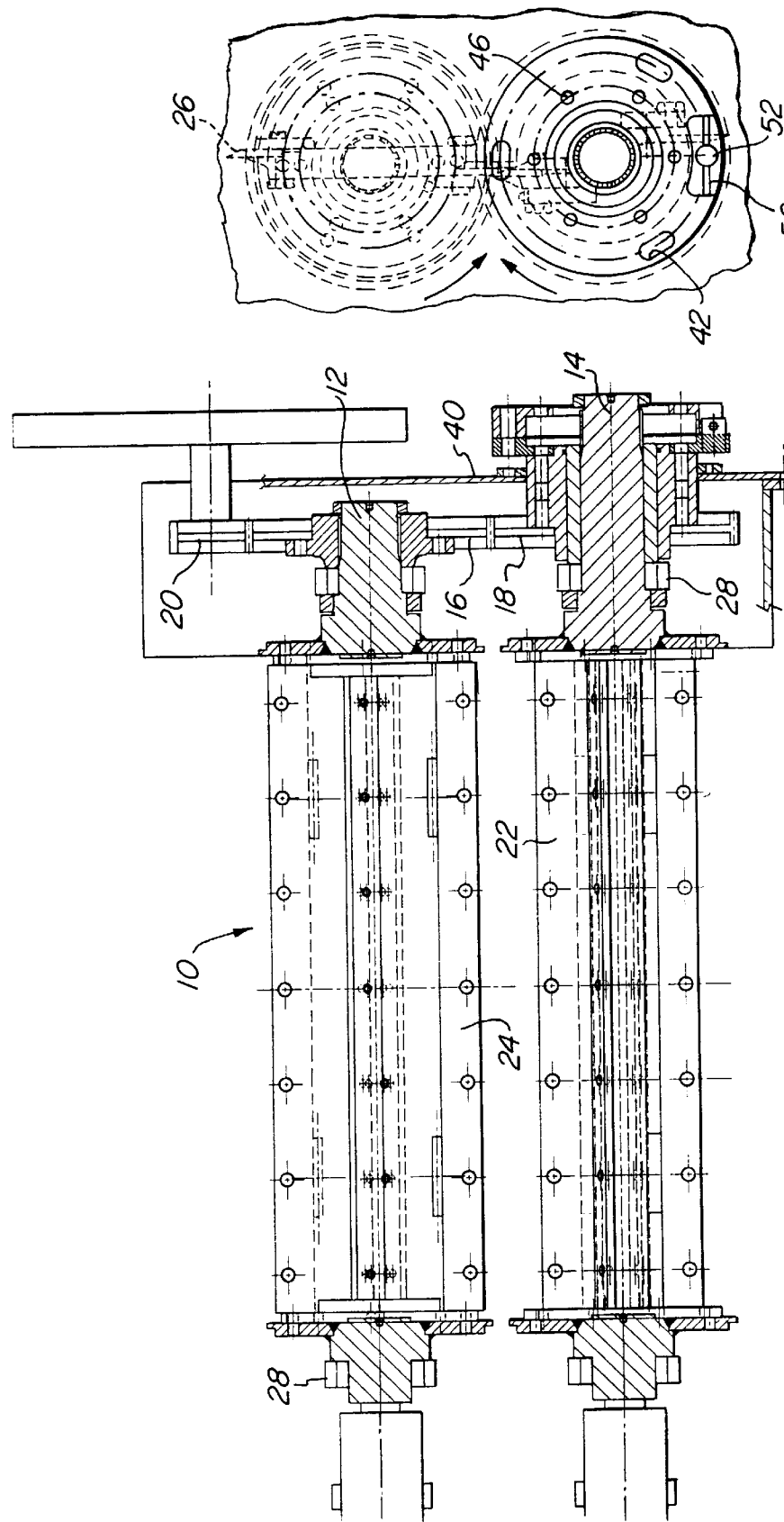

ADJUSTABLE CHOPPER SHAFT

TECHNICAL FIELD

This invention relates to an adjustable chopper shaft.

This invention has particular but not exclusive application to chopper assemblies for sugar cane harvesters and the like.

BACKGROUND ART

Chopper assemblies for sugar cane harvesters include a pair of counter-rotating gear-driven chopper shafts carrying opposed and overlapping blades which cooperate to cut the elongate sugar cane stalks into shorter billets.

As wear of the blades inevitably occurs, the clearance between the opposed and overlapping counter-rotating blades increases and cutting efficiency is lost.

It is known to provide means for selectively allowing rotation of one of the chopper shafts relative to its gear so that the chopper shaft can be rotated to thereby close the clearance between the overlapping blades. In this known system these means are contained within the gearbox. Therefore, making an adjustment is a difficult exercise which also risks the introduction of contaminants to the gearbox.

DISCLOSURE OF INVENTION

This invention in one aspect resides in an adjustable chopper shaft including:
 a chopper shaft;
 a gear concentrically mounted with respect to the chopper shaft for transmitting power thereto, the gear being accomodated in a gearbox in use;
 means for selectively allowing rotation of the chopper shaft relative to the gear,
 wherein, in use, the means for selectively allowing rotation of the chopper shaft relative to the gear is located externally of the gearbox.

In another aspect the invention resides in an adjustable chopper shaft including:
 a chopper shaft;
 a mounted concentrically upon and gear adjacent one end of the chopper shaft, the chopper shaft extending axially beyond the gear and the gear including an axial extension;
 wherein said extension of the chopper shaft and said axial extension of the gear constitute means for coupling the gear and the chopper shaft and selectively allowing rotation of the chopper shaft relative to the gear.

In another aspect the invention resides in a chopper assembly including:
 a pair of opposed and counter-rotating chopper shafts;
 a gear concentrically mounted on each of the shafts for transmitting power to the shafts, the gears being meshed;
 a gear box accomodating the meshed gears;
 characterised in that means for selectively allowing rotation of at least one of the chopper shafts relative to its gear is located externally of the gearbox.

BRIEF DESCRIPTION OF DRAWINGS

In order that this invention may be more easily understood and put into practical effect, reference will now be made to the accompanying drawings which illustrate a preferred embodiment of the invention, wherein:

FIG. 1 is a sectioned elevation of an adjustable chopper shaft incorporated in a chopper assembly;

FIG. 2 is an end elevation of the chopper assembly of FIG. 1; and

BEST MODE

Figure 3:
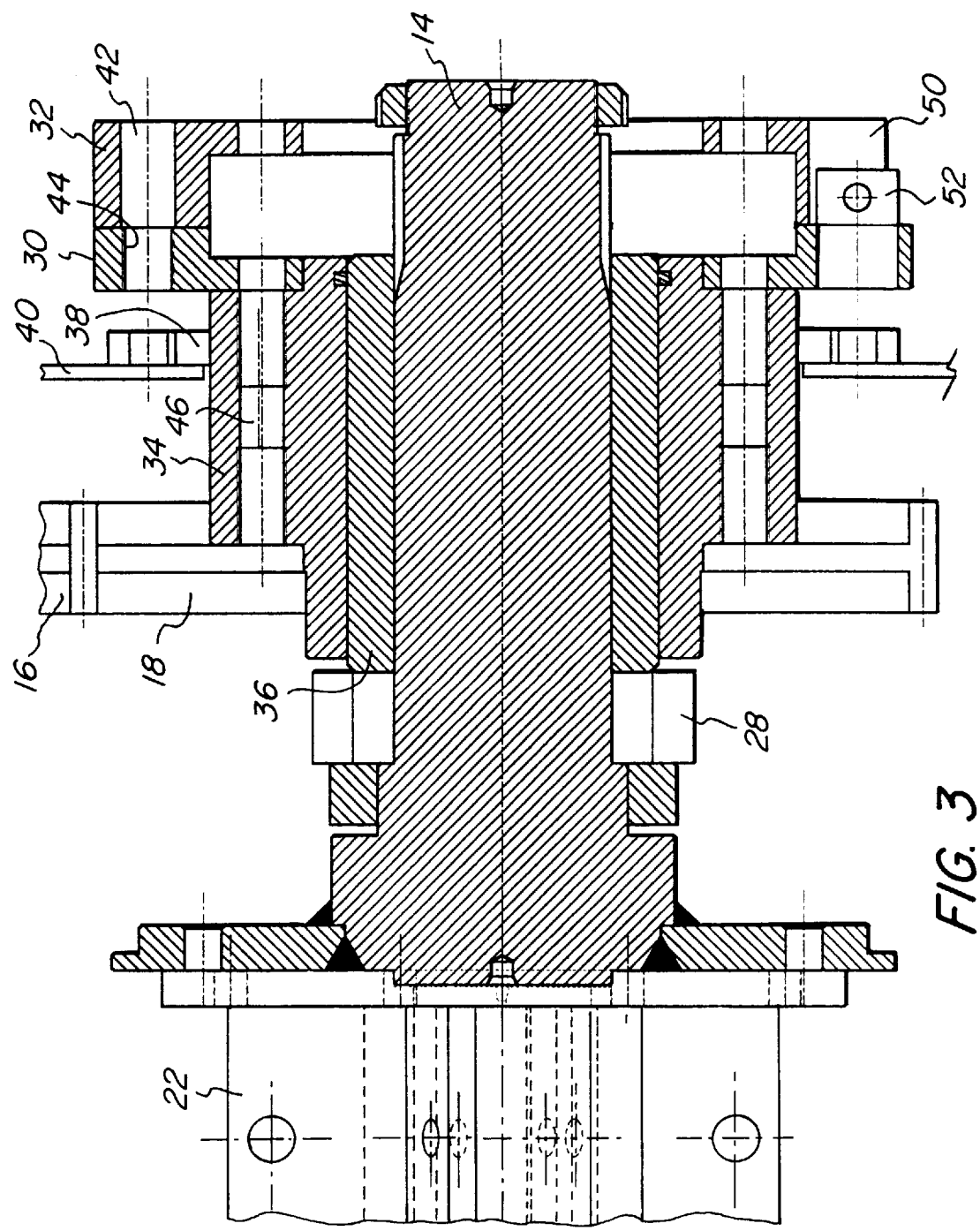
FIG. 3 is an enlarged detail view of FIG. 1.

With reference to FIGS. 1 and 2, there is illustrated a chopper assembly 10 including an upper chopper shaft 12 and a lower chopper shaft 14 mounted for counter-rotation via bearings 28.

The upper chopper shaft 12 and lower chopper shaft 14 each have a concentrically mounted gear 16 and 18, respectively. Gears 16 and 18 are meshed and drive is provided to gear 16 by input drive gear 20. Gears 16, 18 and 20 are housed within gearbox 40.

Gear 16 is permanently rotatably coupled to upper chopper shaft 12 by known means such as keying or splining, for example. In contrast, gear 18 is adjustably rotatably coupled to lower chopper shaft 14 as will be discussed later with reference to FIG. 3.

Both chopper shafts are adapted to carry blades (not shown in FIG. 1). The lower chopper shaft includes a drilled mount 22 for receiving the lower blade and the upper chopper shaft includes a drilled mount 24 for receiving the upper blade. The upper and lower blades are shown in ghosted line in FIG. 2 and the upper blade is most clearly seen at 26.

The upper and lower blades cooperate to cut sugar cane stalks into shorter billets as they pass between the counter-rotating blades. As will be observed in FIG. 2 the upper blade leads and overlaps with the lower blade during cutting. Accordingly, wear occurs predominantly on the trailing face of the upper leading blade and on the leading face of the lower trailing blade. This wear results in a clearance opening between the upper and lower blades. This wear is compensated for by advancing the lower trailing blade thereby closing the clearance.

Referring now to FIG. 3, the mechanism for advancing the lower trailing blade relative to the upper leading blade is shown in detail.

As can be seen shaft 14 extends axially beyond gearbox 40. Shaft 14 includes a flange in the form of outer adjusting plate 32 which includes slots 42.

Gear 18 is fixed to bush 34 which in turn is fixed to inner adjusting plate 30 which includes threaded apertures 44 which align with slots 42 in the outer adjusting plate. The gear 18, bush 34 and inner adjusting plate 30 are bolted together by a bolt extending through bore 46 defined by the three components.

A seal 38 is provided to effect a seal between the wall of the gearbox 40 and the bush 34.

A second inner bush 36 is provided to axially locate bearing 28.

During operation bolts extend through slots 42 into threaded apertures 44 and are tightened to thereby clamp together the inner and outer adjustment plates 30 and 32. Thus drive is sequentially transferred from gear 18 to shaft 14 via bush 34, inner adjusting plate 30 and outer adjusting plate 32.

When wear has occured and it is desired to advance the lower trailing blade the bolts which extend through slots 42 into threaded aperatures 44 are backed off and the outer plate 32 can be rotated clockwise (FIG. 2) relative to the inner plate 30 thereby rotating the shaft 14 clockwise (FIG. 2) relative to the gear 18 and hence advancing the trailing lower blade without moving the upper leading blade.

To facilitate this adjustment, outer adjustment plate 32 includes a scalloped region 50 and inner adjustment plate includes a stub 52 which is screwed into a threaded aperture which lies on the same pitch circle diameter as the other threaded apertures 44. To adjust the outer adjustment plate relative to the inner adjustment plate, a pinch bar or other lever can be inserted into the scalloped region with the tip of the lever engaging the stub and the stub can then be levered to generate relative rotation between the inner and outer adjustment plates. Alternatively, the stub 52 may include a threaded bore which receives a threaded bolt. In this arrangement the bolt can be manually grasped to advance the trailing blade.

After the adjustment has been made, the bolts are re-tightened and the chopper assembly is ready for use.

Whilst in the above embodiment the upper blade has led and the lower blade has trailed, this could be reversed. Similarly, whilst in the above embodiment the trailing blade has been advanced to close the clearance, the leading blade could be retarded for the same result.

The present invention provides an adjustable chopper shaft in which the adjustment can be made without having to open up the gearbox thereby risking the introduction of contaminants to the gearbox. Furthermore, the adjustment operation is easier and quicker.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. An adjustable chopper shaft including:

a chopper shaft;

a gear concentrically mounted with respect to the chopper shaft for transmitting power thereto, the gear being accommodated in a gearbox in use;

means, located externally of the gearbox, for selectively allowing rotation of the chopper shaft relative to the gear.

2. An adjustable chopper shaft as claimed in claim 1, wherein the chopper shaft extends beyond the gearbox and wherein an axial extension extends from the gear beyond the gearbox, the chopper shaft and axial extension being rotatably coupled during operation and selectively uncoupled to facilitate rotational adjustment of the chopper shaft relative to the gear.

3. An adjustable chopper shaft as claimed in claim 2, wherein the chopper shaft includes a first flange and the axial extension includes a second flange, the flanges being adjustably and rotatably coupled together.

4. An adjustable chopper shaft including:

a chopper shaft;

a concentric gear adjacent one end of the chopper shaft, the chopper shaft extending axially beyond the gear and the gear including on axial extension;

wherein said extension of the chopper shaft and said axial extension of the gear constitute means for coupling the gear and the chopper shaft and selectively allowing rotation of the chopper shaft relative to the gear.

5. A chopper assembly including:

a pair of opposed and counter-rotating chopper shafts;

a gear concentrically mounted on each of the shafts for transmitting power to the shafts, the gears being meshed;

a gear box accomodating the meshed gears;

characterised in that means for selectively allowing rotation of at least one of the chopper shafts relative to its gear is located externally of the gearbox.

* * * * *